April 5, 1938.  P. L. CILLEY  2,113,505
MANUALLY OPERABLE DRIVING DEVICE
Filed Jan. 28, 1937
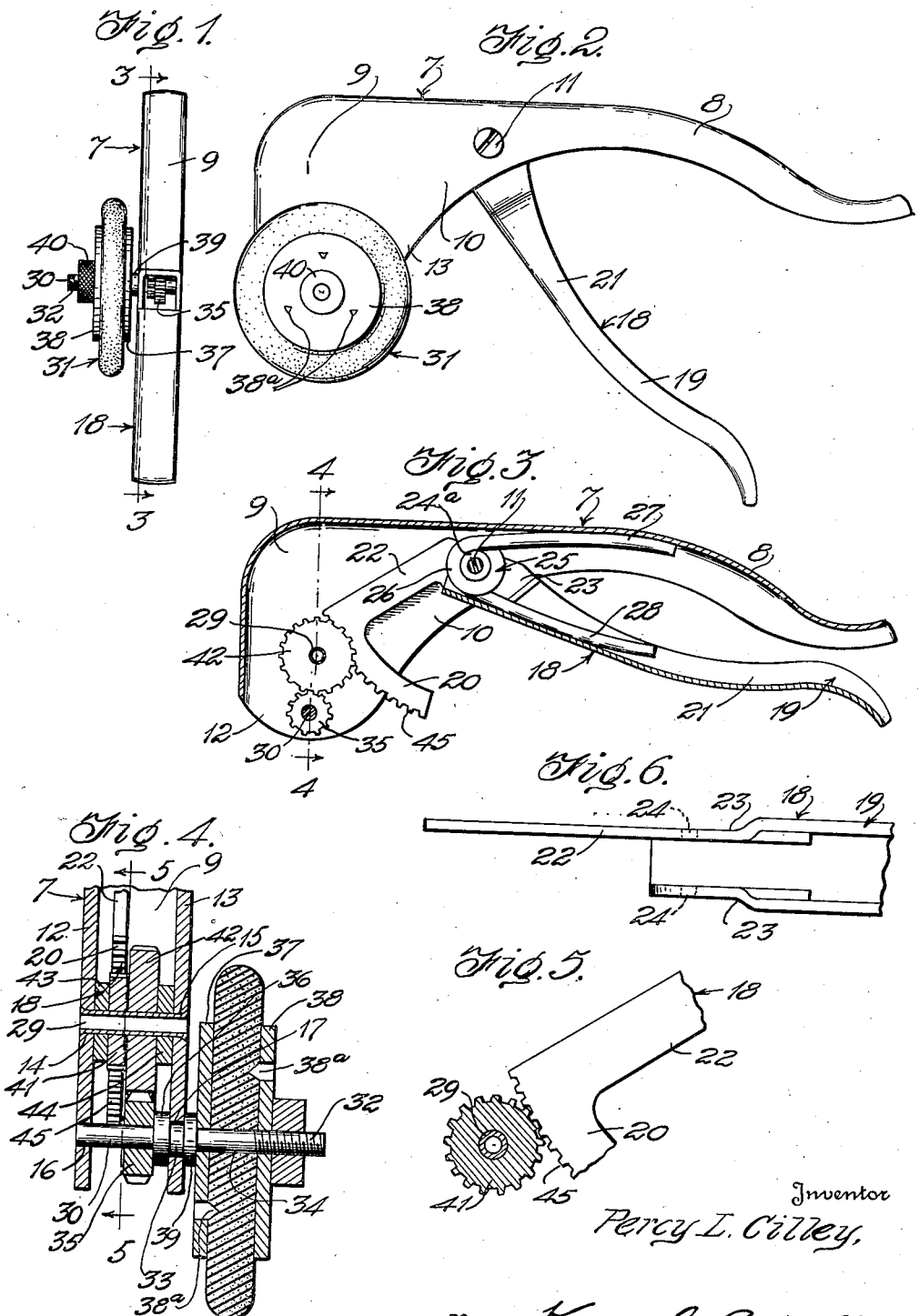
Inventor
Percy L. Cilley,
By Kimmel & Crowell
Attorneys Patented Apr. 5, 1938

2,113,505

UNITED STATES PATENT OFFICE 2,113,505

MANUALLY OPERABLE DRIVING DEVICE

Percy L. Cilley, La Crosse, Wis.

Application January 28, 1937, Serial No. 122,853

1 Claim. (Cl. 51—170)

This invention relates to a manually operable driving device of the hand portable and positioning type.

The invention has for its object to provide, in a manner as hereinafter set forth, a device of the class referred to for manually positioning an abrading, erasing, cleaning or polishing element at the work to be acted upon and then manually operating a driving means for the element to provide for the latter performing its function.

Further objects of the invention are to provide, in a manner as hereinafter set forth, a device for the purpose referred to which is simple in its construction, strong, durable, compact, conveniently handled when positioning and operating it, thoroughly efficient in its use, readily assembled and comparatively inexpensive to manufacture.

To the above ends essentially and to others which may hereinafter appear, the invention consists of the novel construction, combination and arrangement of parts as will be more specifically referred to and are as illustrated in the accompanying drawing wherein is shown an embodiment of the invention, but it is to be understood that changes, variations and modifications may be resorted to which fall within the scope of the invention as claimed.

The adaptation of the invention is shown by way of example in connection with a pencil and ink eraser element of the rubber type.

In the drawing:

Figure 1 is an elevation of the device looking towards its front and showing the same coupled with a pencil and ink eraser-element for the purpose of positioning the latter relative to and for action on the work, Figure 2 is a side elevation of the device, Figure 3 is a section on line 3—3, Figure 1, Figure 4 is a fragmentary view in section on line 4—4, Figure 3, Figure 5 is a fragmentary view in section on line 5—5, Figure 4 and Figure 6 is a fragmentary view in inverted plan of the shiftable combined handle and operable actuating element.

The device includes a horizontally disposed stationary combined handle and housing element or means 7 consisting of a handle portion 8 and a depending housing portion 9. The portion 8 in cross section is of downwardly opening channel-shaped contour and has its forward part 10 of substantially triangular contour merging into the back of the housing portion 9. The latter is closed at its top and front and open at its bottom and back. Secured to and extending transversely of the forward part 10 of portion 8 is a pivot 11 arranged in proximity to the top and rear end of said part 10. By way of example, the pivot 11 is shown in the form of a countersunk screw. The sides 12, 13 of housing 9 are formed with a pair of aligning countersunk openings 14, 15 respectively and also with a pair of aligning openings 16, 17 aligning with and arranged below the openings 14, 15 respectively. The opening 17 is of greater diameter than opening 16.

The device includes a horizontally disposed shiftable combined handle and actuating element 18 consisting of a combined handle and lever portion 19 and a segmental rack portion 20 disposed on one of its lengthwise edges. The portion 19 consists of a handle part 21 of channel shape cross section having extending forwardly from the forward end of one side thereof and at a downward inclination an arm 22 merging at its lower end into the upper side of the arcuate rack portion 20. The latter extends rearwardly and at a downward inclination from the lower end of arm 22. The length of portion 20 is substantially the same as that of arm 22. The latter is completely arranged in housing portion 9. The rack portion 20 is for passage through the open back of housing portion 9. The teeth on portion 20 are on the lower lengthwise edge of the latter. The forward terminal portions of the sides of the handle part 21 are inset as at 23 and have aligned openings 24. The portions 23 are extended upwardly into the part 10 of portion 8 of element 7 and are mounted on the pivot 11. Positioned on the pivot 11 and between the portions 23 is a collar 24.

A controlling spring 25 is associated with the element 18 which normally tends to force the latter to the position shown in Figure 2. The operation of the device is had against the action of spring 25. The latter includes a central coiled part 26 and a pair of rearwardly extending oppositely outwardly inclined end parts 27, 28. The coiled part 26 is mounted on collar 24, the end part 27 bears against the inner face of handle portion 8 and the end part 28 bears against the inner face of portion 19 of element 18.

Extending transversely of housing portion 9 and having its ends upset in the openings 14, 15 is a fixed tubular shaft 29. Mounted in the openings 16, 17 and extending laterally from the opening 17 is a rotatable operating shaft 30 for the eraser-element 31. The shaft 30 has one of its end terminal portions peripherally threaded as at 32 and is formed intermediate its ends with a peripheral annular boss 33 constituting a bearing riding against the wall of opening 17. The element 31 has an axial opening 34 for the passage of shaft 30. Fixed to the latter, intermediate its ends, is a gear 35. Mounted on shaft 30 and interposed between gear 35 and housing side 13 is a stop collar 36. Positioned on shaft 30 and bearing against each side of element 31 are oppositely disposed holder discs 37, 38 provided with barbs 38a extending into the body of element 31. The discs 37, 38 act to prevent element 31 from revolving on shaft 30. The latter carries a stop collar 39 which is interposed between housing side 13 and disc 37. The element 31 and discs 37, 38 are clamped to shaft 30 for the purpose of bodily rotating therewith by a clamping nut 40 engaging with the threaded terminal portion 32 of shaft 30 and abutting the outer face of disc 38.

Revolubly mounted on shaft 29 is a power transmitting element consisting of a pinion 41 and a gear 42 fixedly secured together. A spacer 43 is carried by shaft 29 and interposed between housing side 12 and pinion 41. A spacer 44 is mounted on shaft 29 and interposed between housing side 13 and gear 42. The teeth 45 of rack portion 20 are permanently in mesh with pinion 41. The gear 42 is permanently in mesh with gear 35. The pinion 41, gear 42 and gear 35 provide a multiplying gear mechanism.

When the combined handle and lever portion 19 is manually moved to the position shown in Figure 3, the shaft 30 will be rotated in a counter-clockwise direction to provide for the operation of the element 31 in a like direction. When portion 19 is released, the spring 25 will provide for the return of portion 19 to the position shown in Figure 2 whereby shaft 30 will be rotated in a clockwise direction to provide for the operation of element 31 in a like direction. When the device is in the position shown in Figure 2 it is evident that part of the inner handle member will abut the inner part of the top of housing at 7, thus forming a stop. The device provides for operating the element 31 alternately in opposite directions, i. e., a series of clockwise revolutions and then a series of anti-clockwise revolutions. When element 31 is manually operated, it will revolve in a counter-clockwise direction and when travelling in such direction it will perform its function when placed against the work. The series of clockwise revolutions is had automatically when pressure is released from the handle member. The diameter of gear 42 is materially greater than that of gear 35 thereby providing for the rapid operation of shaft 30.

The element which is to be operated from shaft 30 is termed a tool.

What I claim is:

In a tool driving device, a pressed metal housing of inverted channel shape forming a handle, the top and forward portions of the channel member being entirely closed and the forward portion extending downwardly to form a dust guard to protect operative parts, the guard housing being approximately L shape in side view, the housing open at its rear, an outer handle merging at its forward end into the upper portion of the rear of the housing, a spring controlling an inner handle extending into and pivotally supported from the forward end of the outer handle, a tool carrying shaft journaled in the side walls of the housing in proximity to their inner ends, said shaft provided intermediate its ends with a pair of spaced collars opposing the inner and outer faces of one of said side walls, a multiplying gearing arranged within the housing and having one of its elements fixed to said shaft, a stationary support within and transversely of the housing, the other of said elements of said gearing revolubly mounted on said support, collars on said support between said gearing and said housing spacing said members to allow free revolution, an inclined arm extending from one side of the forward end of said inner handle in a direction towards said support, and a segmental-shaped rack carried by said arm and operatively engaging in one of the said other of said elements of said gearing said arm arranged to abut the inner side of the top of said housing under influence of said spring.

PERCY L. CILLEY.